July 12, 1927.
H. BLUMER
1,635,657
DRIVE OF THREE-AXLED MOTOR VEHICLE
Filed Dec. 9, 1926
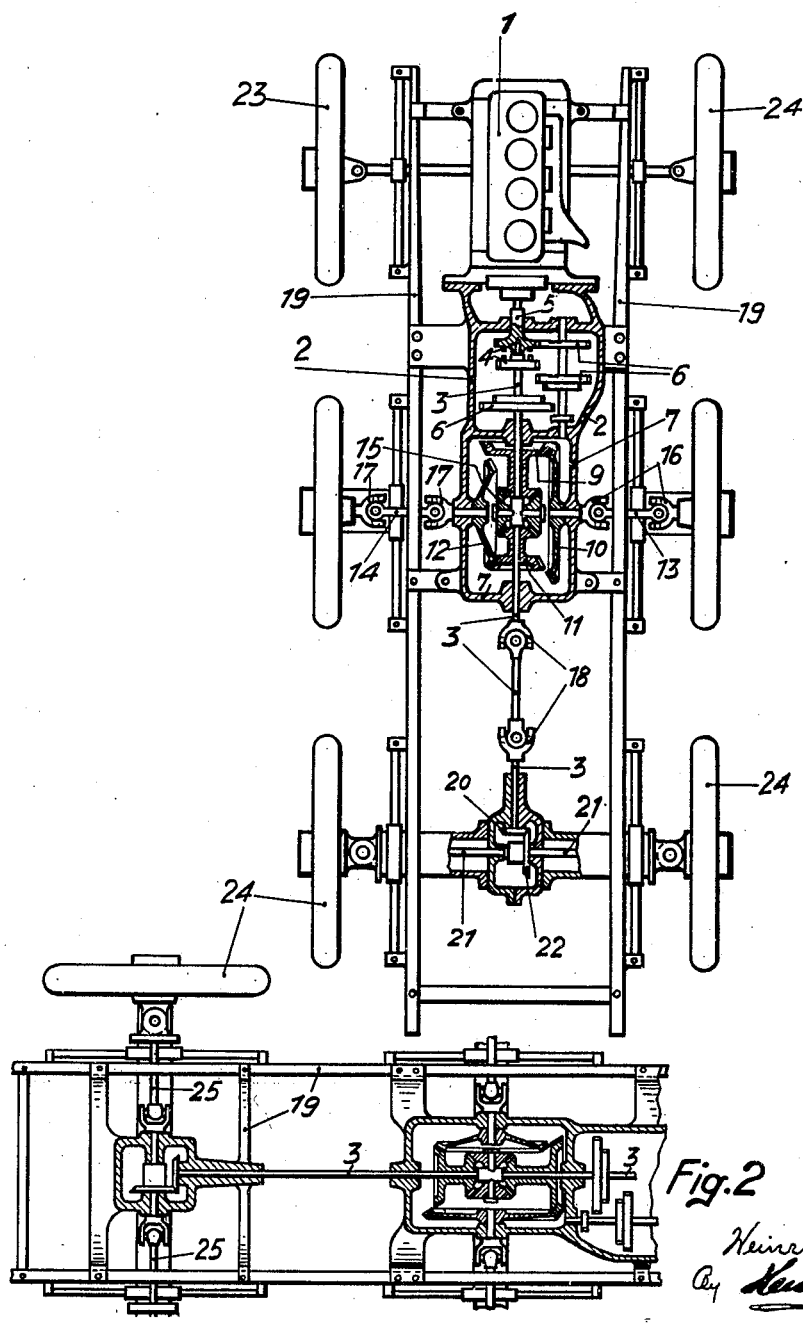

Patented July 12, 1927.

1,635,657

UNITED STATES PATENT OFFICE.

HEINRICH BLUMER, OF ZURICH, SWITZERLAND.

DRIVE OF THREE-AXLED MOTOR VEHICLES.

Application filed December 9, 1926, Serial No. 153,639, and in Switzerland December 12, 1925.

This invention relates to transmission mechanism for driving the two pairs of rear wheels of three-axled motor vehicles having a shaft running from end to end longitudinally thereof and its object is to enable the so-called direct drive to be used in this class of vehicle, that is to say, direct coupling of the longitudinal shaft with the motor shaft at high running speeds. A further object is to avoid the necessity for providing worms and worm wheels. For this purpose, according to the invention, the two wheels of the middle axle are actuated by two bevel drives, whereof the driving wheels, which are co-axial with the longitudinal shaft, are connected to each other and to the said shaft, through the medium of a bevel differential gear.

In vehicles having two axles only it has been already proposed to use driving mechanism of this kind comprising two bevel wheel driving gears and a bevel differential. No attempt has however been made hitherto to secure a direct drive for the middle and rear axles of a three-axled vehicle.

In the accompanying drawing two constructional forms of the invention are shown by way of example.

Fig. 1 shows a plan view, partly in section, of a first embodiment, and

Fig. 2 shows a modification, in which a longitudinal main driving shaft is mounted for the whole of its length in the main frame of the car.

Numeral 1 designates the motor and 2 the gear box of the vehicle, the axles of which are placed at approximately equal distances apart and the front wheels 23 and rear wheels 24 of which are pivoted for steering purposes. 3 is the main driving shaft which extends longitudinally of the vehicle and which for high running speeds can be coupled directly to the motor shaft 5 by means of a dog clutch 4. At lower speeds the transmission of the drive from the motor shaft 5 to the longitudinal driving shaft 3 is effected in the usual way through toothed wheel gearing 6. The casing 7 of the driving mechanism for the middle axle is combined into a whole with the gear box 2. The motor 1, the gear box 2 and the casing 7 are combined into a unit and rigidly mounted in the chassis 19 of the vehicle. The wheels of the middle axle 13, 14 are driven by two bevel gears 9, 10 and 11, 12 of which the driving wheels 9, 11, which are co-axial with the longitudinal shaft 3 are connected to each other and to the shaft 3 by a bevel differential gear 15. The play of the springs cooperating with the middle axle necessitates the use of universal joints 16 and 17 respectively for the parts 13, 14 of said axle while the play of the springs cooperating with the rear axle is rendered possible by universal joints 18. On the rear end of the longitudinal shaft 3 is mounted a bevel wheel 20 which meshes with a bevel wheel 22 mounted fast on the rear axle 21 and thereby drives the wheels 24 of said axle.

As shown in Fig. 2 the longitudinal main driving shaft 3 may if desired be mounted for the whole of its length in the frame 19 or chassis. In such case the wheels 24 of the rear axle must be driven by this main shaft 3 through transverse Cardan shafts 25.

It is here to be observed that the tie-rod or radius-rod system used, the distance apart of the axles, and the method of springing employed are immaterial to the purposes of the present invention.

I claim:

1. In a three-axled motor vehicle, a transmission mechanism for driving the two pairs of rear wheels, comprising in combination a shaft running from end to end longitudinally of the vehicle, two bevel wheel gearings for driving the middle axle, the driving wheels of said bevel wheel gearings being co-axial with said longitudinal shaft, and a bevel differential gear connecting said driving wheels to each other and to said longitudinal shaft.

2. In a three-axled motor vehicle, a transmission mechanism for driving the two pairs of rear wheels, comprising in combination, a shaft running from end to end longitudinally of the vehicle, two Cardan shafts for driving the middle pair of wheels, two bevel wheel gearings interposed between said longitudinal shaft and said Cardan shafts, the driving wheels of said bevel wheel gearings being co-axial with said longitudinal shaft, and a bevel differential gear connecting said driving wheels to each other and to said longitudinal shaft.

3. In a three-axled motor vehicle, a transmission mechanism for driving the two pairs of rear wheels, comprising in combination, a shaft running from end to end longitudinally of the vehicle, two Cardan shafts for driving the middle pair of wheels, two bevel wheel gearings interposed between said longitudinal shaft and said Cardan shafts, the driving wheels of said bevel wheel gearings being co-axial with said longitudinal shaft, a bevel differential gear connecting said driving wheels to each other and to said longitudinal shaft, and two universal joints inserted into said longitudinal shaft between the middle and rear axles.

In testimony whereof, I have signed my name to this specification.

HEINRICH BLUMER.